(12) United States Patent
Jin

(10) Patent No.: US 12,146,610 B2
(45) Date of Patent: Nov. 19, 2024

(54) MULTIFUNCTIONAL MOBILE PHONE MOUNT

(71) Applicant: Danqiong Jin, Hangzhou (CN)

(72) Inventor: Danqiong Jin, Hangzhou (CN)

( * ) Notice: Subject to any disclaimer, the term of this patent is extended or adjusted under 35 U.S.C. 154(b) by 0 days.

(21) Appl. No.: 18/230,190

(22) Filed: Aug. 4, 2023

(65) Prior Publication Data

US 2024/0344654 A1 Oct. 17, 2024

(30) Foreign Application Priority Data

Apr. 17, 2023 (CN) .......................... 202320905983.8

(51) Int. Cl.
*F16M 11/00* (2006.01)
*F16M 13/00* (2006.01)

(52) U.S. Cl.
CPC ................................ *F16M 13/005* (2013.01)

(58) Field of Classification Search
CPC .................................................. F16M 13/005
See application file for complete search history.

(56) References Cited

U.S. PATENT DOCUMENTS

| | | | | |
|---|---|---|---|---|
| 5,273,242 A * | 12/1993 | Mouri | ................... | B60N 2/067 248/429 |
| 6,820,851 B2 * | 11/2004 | Mochizuki | ............. | B60N 2/067 248/429 |
| 7,048,244 B2 * | 5/2006 | Hauck | ................... | B60N 2/073 248/430 |
| 9,987,951 B2 * | 6/2018 | Bonk | ................... | B60N 2/0843 |
| 2022/0282828 A1 * | 9/2022 | Ng | .......................... | G06F 1/166 |
| 2023/0195176 A1 * | 6/2023 | Perelli | ..................... | G06F 1/166 361/679.01 |
| 2023/0346094 A1 * | 11/2023 | Hsu | ..................... | F16M 13/022 |

* cited by examiner

*Primary Examiner* — Amy J. Sterling

(57) ABSTRACT

Disclosed is a multifunctional mobile phone mount, including a folding assembly, a support backplate, and a bonding base. A first magnetic adsorption assembly is provided inside the folding assembly, a third magnetic adsorption assembly is provided inside the bonding base, a second magnetic adsorption assembly and a fourth magnetic adsorption assembly are provided inside the support backplate, and a body including the folding assembly and the support backplate is fixed through adsorption between the fourth magnetic adsorption assembly and the third magnetic adsorption assembly inside the bonding base. In the present disclosure, a mobile phone and the support backplate are magnetically attached to each other, such that the mobile phone can be fixed to a side of a laptop or tablet PC and displayed in a vertical state or a horizontal state, thereby realizing multi-mode operations of portrait and landscape.

7 Claims, 11 Drawing Sheets

MULTIFUNCTIONAL MOBILE PHONE MOUNT

TECHNICAL FIELD

The present disclosure relates to the technical field of mobile phone mounts, and in particular, to a multifunctional mobile phone mount.

BACKGROUND

With the development of the times, smartphones have become one of the essential items for contemporary people. Due to the update and iteration of the smartphones, many auxiliary accessories for use with mobile phones have also been derived, such as card holders attached to the backs of the mobile phones, and folding supports pasted to the backs of the mobile phones.

According to the needs of the times, the mobile phones are usually used with laptops or tablet personal computers (PCs). If the mobile phones need to be used as side screens of the computers, or main cameras of the mobile phones are used as remote video collaboration cameras of the computers, separate mobile phone mounts are generally required to fix the mobile phones. However, the accessories in existing products each have a relatively single function, and are independent of each other, resulting in a significant limitation of use.

With this regard, a multifunctional mobile phone mount is provided.

SUMMARY

The present disclosure mainly solves the above technical problems in the prior art, and provides a multifunctional mobile phone mount.

To achieve the above purpose, the present disclosure provides the following technical solutions: A multifunctional mobile phone mount, comprising a folding assembly, a support backplate, and a bonding base, wherein the support backplate is connected to a front surface of the folding assembly through a sewing process, an opening is provided at a top of a joint between the folding assembly and the support backplate, an interlayer space is formed between the folding assembly and the support backplate, a first magnetic adsorption assembly is provided inside the folding assembly, a third magnetic adsorption assembly is provided inside the bonding base, a second magnetic adsorption assembly and a fourth magnetic adsorption assembly are provided inside the support backplate, and a body comprising the folding assembly and the support backplate is fixed through adsorption between the fourth magnetic adsorption assembly and the third magnetic adsorption assembly inside the bonding base.

Optionally, the folding assembly comprises a first hard bone plate, a second hard bone plate, a third hard bone plate, a fourth hard bone plate, and two groups of support outer wrapping layers, wherein the two groups of support outer wrapping layers are sewn together to wrap the first hard bone plate, the second hard bone plate, the third hard bone plate and the fourth hard bone plate inside; the first hard bone plate, the second hard bone plate, the third hard bone plate and the fourth hard bone plate are not fixed to each other; joints between the first hard bone plate, the second hard bone plate, the third hard bone plate and the fourth hard bone plate are connected through soft materials formed by the two groups of support outer wrapping layers; the first magnetic adsorption assembly inside the folding assembly is formed by a first annular magnet fixed in an annular groove at a middle position of the second hard bone plate; first magnetic ring fixing plates fixing the magnetic adsorption assembly inside the folding assembly are fixed to two sides of the second hard bone plate; a magnet sheet is mounted on a side of a bottom of the third hard bone plate close to the support backplate; and the third hard bone plate and the fourth hard bone plate are metal sheets capable of generating an adsorption effect with a magnet.

Optionally, the support backplate comprises two groups of backplate outer wrapping layers and a fifth hard bone plate, wherein the two groups of backplate outer wrapping layers are sewn together to wrap the fifth hard bone plate inside; the fourth magnetic adsorption assembly inside the support backplate is formed by magnets fixed in a groove formed in a bottom of the fifth hard bone plate; the second magnetic adsorption assembly is formed by a second annular magnet fixed in an annular groove at a middle position of the fifth hard bone plate; and second magnetic ring fixing plates fixing the magnetic adsorption assembly inside the support backplate are fixed to two sides of the fifth hard bone plate.

Optionally, the bonding base comprises a double-sided adhesive member, a sixth hard bone plate, and two groups of bonding base outer wrapping layers, wherein the two groups of bonding base outer wrapping layers are sewn together to wrap the sixth hard bone plate inside; the double-sided adhesive member is fixed on an outer surface of one side of the bonding base outer wrapping layer; the third magnetic adsorption assembly inside the bonding base is formed by bonding base magnets provided in two groups of grooves at a middle position of the sixth hard bone plate; the two groups of grooves are staggered from each other; and third magnetic ring fixing plates fixing the magnetic adsorption assembly inside the bonding base are fixed to two sides of the sixth hard bone plate.

Optionally, the first hard bone plate, the second hard bone plate, the first magnetic ring fixing plates, the fifth hard bone plate, and the sixth hard bone plate are made of a metal or plastic material.

Optionally, the support outer wrapping layers, the backplate outer wrapping layers, and the bonding base outer wrapping layers are made of polyurethane (PU), or a genuine leather, or a fabric.

Optionally, the magnets and the bonding base magnets are all arranged obliquely at an angle of 45 degrees, and each comprise three strip-shaped magnet members.

Beneficial Effects

The present disclosure provides a multifunctional mobile phone mount. The present disclosure has the following beneficial effects:

(1). According to the multifunctional mobile phone mount, it is convenient to fixedly connect a folding assembly to a rear side corner of a laptop or tablet PC in use through a provided bonding base. At this time, the bonding base and a support backplate are magnetically attached to each other, and a mobile phone and the support backplate are magnetically attached to each other, such that the mobile phone can be fixed to a side of the laptop or tablet PC and displayed in a vertical state or a horizontal state, thereby realizing multi-mode operations of portrait and landscape, and meeting daily use requirements.

(2). According to the multifunctional mobile phone mount, the mobile phone and the folding assembly are magnetically attached to each other, such that the mobile phone can be fixed to a side of the laptop or tablet PC, and a rear camera of the mobile phone is provided on a side facing the computer to replace a computer camera through software connection, thereby improving the quality of picture acquisition.

(3). According to the multifunctional mobile phone mount, a first annular magnet and a second annular magnet are respectively provided inside the folding assembly and the support backplate. Due to the first annular magnet and the second annular magnet, the mobile phone can be magnetically attached to an outer surface of the folding assembly or an outer surface of the support backplate. A card article such as an identity card or a bank card can be placed in an opening at a top of a joint between the folding assembly and the support backplate and an interlayer space formed between the folding assembly and the support backplate. The card article is stored inside a folding mobile phone mount, and the folding mobile phone mount is attached to the mobile phone, thereby achieving the effect of convenience for carrying or removal of a card from the back of the folding mobile phone mount.

(4). According to the multifunctional mobile phone mount, the mobile phone and the support backplate are attached to each other, the folding assembly is unfolded into a triangle, and at this time, the folding assembly and the support backplate form a mobile phone mount.

BRIEF DESCRIPTION OF THE DRAWINGS

In order to illustrate the embodiments of the present disclosure or the technical solutions in the prior art more clearly, accompanying drawings needing to be used in the description of the embodiments or the prior art will be briefly described below. Obviously, the accompanying drawings in the following description are only exemplary. For those of ordinary skill in the art, other implementation drawings can be derived from the provided accompanying drawings without creative work.

The structures, scales and sizes shown in the specification are merely intended to match the content disclosed herein for the understanding and reading of those skilled in the art. They are not intended to limit the implementation conditions of the present disclosure, so they have no technical significance. Any modification to the structure, change in the proportional relationship or adjustment in the size should still fall within the scope of the technical content disclosed in the present disclosure without affecting the effects and objectives that can be achieved by the present disclosure.

REFERENCE NUMERALS

Figure 1:
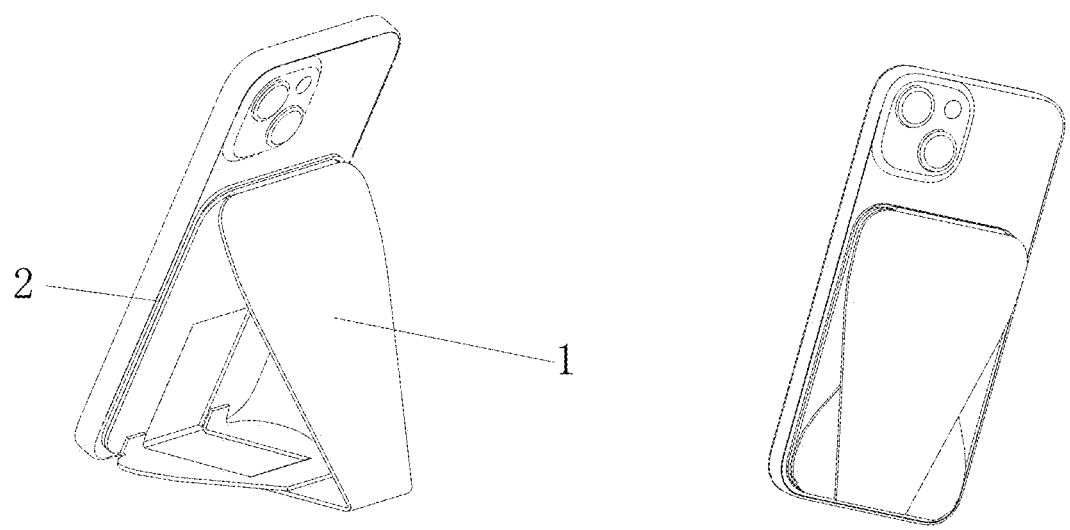
FIG. 1 is a schematic diagram of a state of the present disclosure as a mobile phone mount or a magnetic adsorption-type card holder.
Figure 2:
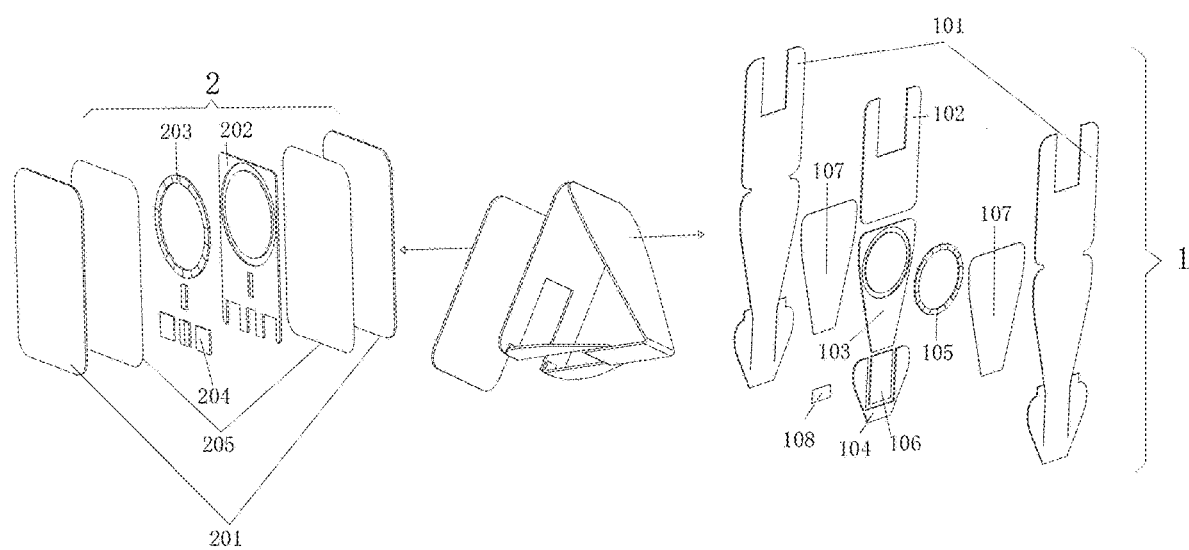
FIG. 2 is a specific schematic diagram of a folding assembly and a support backplate according to the present disclosure.

1. Folding assembly; 101. Support outer wrapping layer; 102. First hard bone plate; 103. Second hard bone plate; 104. Third hard bone plate; 105. First annular magnet; 106. Fourth hard bone plate; 107. First magnetic ring fixing plate; 108. Magnet sheet; 2. Support backplate; 201. Backplate outer wrapping layer; 202. Fifth hard bone plate; 203. Second annular magnet; 204. Magnet; 205. Second magnetic ring fixing plate; 3. Bonding base; 301. Bonding base outer wrapping layer; 302. Double-sided adhesive member; 303. Sixth hard bone plate; 304. Bonding base magnet; and 305. Third magnetic ring fixing plate.

DETAILED DESCRIPTION OF THE EMBODIMENTS

The technical solutions in embodiments of the present disclosure will be described below clearly and completely with reference to the accompanying drawings in the embodiments of the present disclosure. Apparently, the described embodiments are merely some, rather than all of the embodiments of the present disclosure. All other embodiments derived from the embodiments of the present disclosure by those of ordinary skill in the art without creative efforts shall fall within the protection scope of the present disclosure.

According to embodiments, as shown in FIG. 1 to FIG. 6, a multifunctional mobile phone mount includes a folding assembly 1, a support backplate 2, and a bonding base 3. The folding assembly 1 is unfolded into a triangle. The support backplate 2 is connected to a front surface of the folding assembly 1 through a sewing process, and an opening is provided at a top of a joint between the folding assembly 1 and the support backplate 2. An interlayer space is formed between the folding assembly 1 and the support backplate 2. A first magnetic adsorption assembly is provided inside the folding assembly 1, a third magnetic adsorption assembly is provided inside the bonding base 3, and a second magnetic adsorption assembly and a fourth magnetic adsorption assembly are provided inside the support backplate 2. A body including the folding assembly 1 and the support backplate 2 is fixed through adsorption between the fourth magnetic adsorption assembly and the third magnetic adsorption assembly inside the bonding base 3. The first magnetic adsorption assembly inside the folding assembly 1 is formed by a first annular magnet 105 fixed in an annular groove at a middle position of the second hard bone plate 103. The fourth magnetic adsorption assembly inside the support backplate 2 is formed by magnets 204 fixed in a groove formed in a bottom of the fifth hard bone plate 202. The second magnetic adsorption assembly is formed by a second annular magnet 203 fixed in an annular groove at a middle position of the fifth hard bone plate 202. The third magnetic adsorption assembly inside the bonding base 3 is formed by bonding base magnets 304 provided in two groups of grooves at a middle position of the sixth hard bone plate 303, and the two groups of grooves are staggered from each other.

The first annular magnet 105 and the second annular magnet 203 are respectively disposed inside the folding assembly 1 and the support backplate 2. Due to the first annular magnet 105 and the second annular magnet 203, a mobile phone can be magnetically attached to an outer surface of the folding assembly 1 or an outer surface of the support backplate 2.

A card article such as an identity card or a bank card can be placed in an opening at a top of a joint between the folding assembly 1 and the support backplate 2 and an interlayer space formed between the folding assembly 1 and the support backplate 2. The card article is stored inside a folding mobile phone mount, and the folding mobile phone mount is attached to the mobile phone, thereby achieving the effect of convenience for carrying or removal of a card from the back of the folding mobile phone mount.

As shown in FIG. 1, the mobile phone and the support backplate 2 are attached to each other, the folding assembly 1 is unfolded into a triangle, and at this time, the folding assembly 1 and the support backplate 2 form a mobile phone mount.

Figure 7:
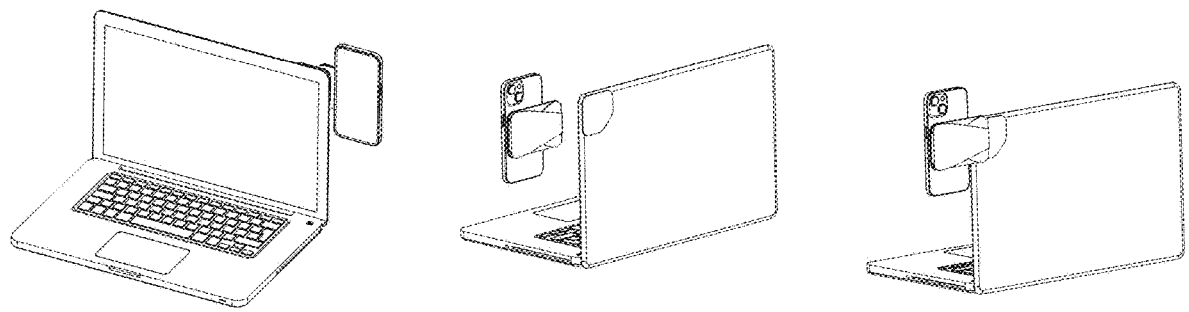
FIG. 7 is a vertical schematic diagram using a mobile phone as a computer attached screen according to the present disclosure.
Figure 8:
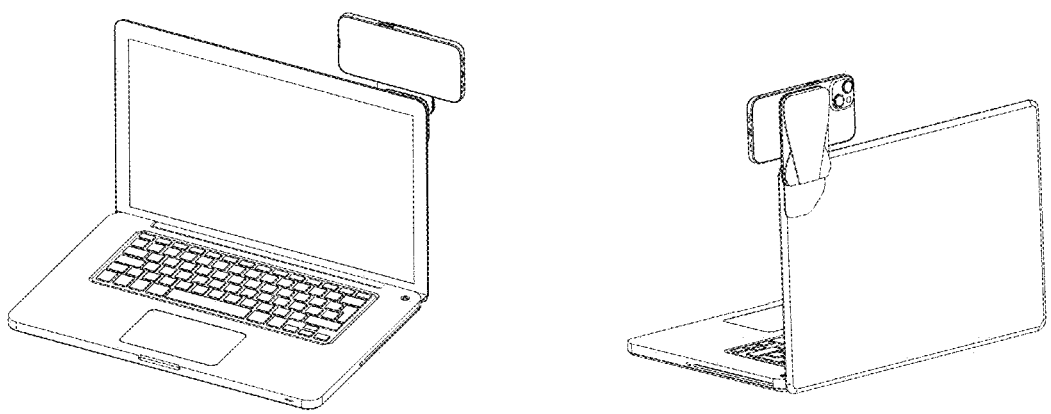
FIG. 8 is a horizontal schematic diagram using a mobile phone as a computer attached screen according to the present disclosure.

As shown in FIG. 7 and FIG. 8, it is convenient to fixedly connect the folding assembly 1 to a rear side corner or edge of a laptop or tablet PC in use through the provided bonding base 3. At this time, the bonding base 3 and the support backplate 2 are magnetically attached to each other, and the mobile phone and the support backplate 2 are magnetically attached to each other, such that the mobile phone can be fixed to a side of the laptop or tablet PC and displayed in a vertical state or a horizontal state, thereby realizing multi-mode operations of portrait and landscape, and meeting daily use requirements.

Figure 9:
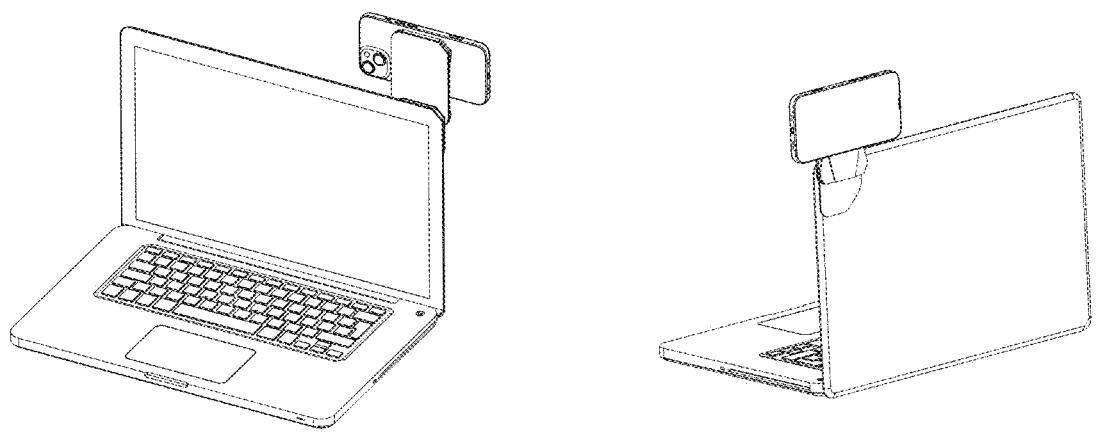
FIG. 9 is a horizontal schematic diagram using a rear camera of a mobile phone as a camera according to the present disclosure.
Figure 10:
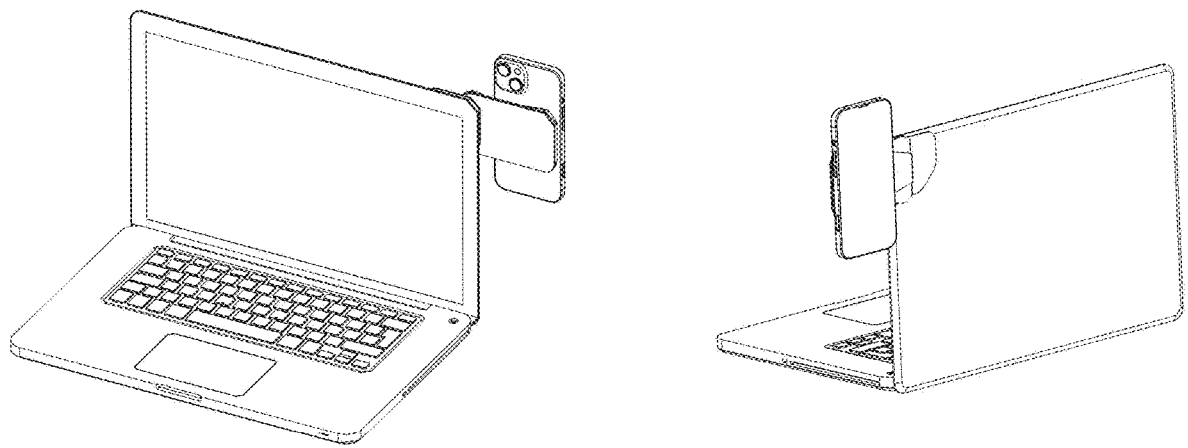
FIG. 10 is a vertical schematic diagram using a rear camera of a mobile phone as a camera according to the present disclosure.

As shown in FIG. 9 and FIG. 10, the mobile phone and the folding assembly 1 are magnetically attached to each other, such that the mobile phone can be fixed to a side of the laptop or tablet PC, and a rear camera of the mobile phone is provided on a side facing the computer to replace a computer camera through software connection, thereby improving the quality of picture acquisition.

Figure 3:
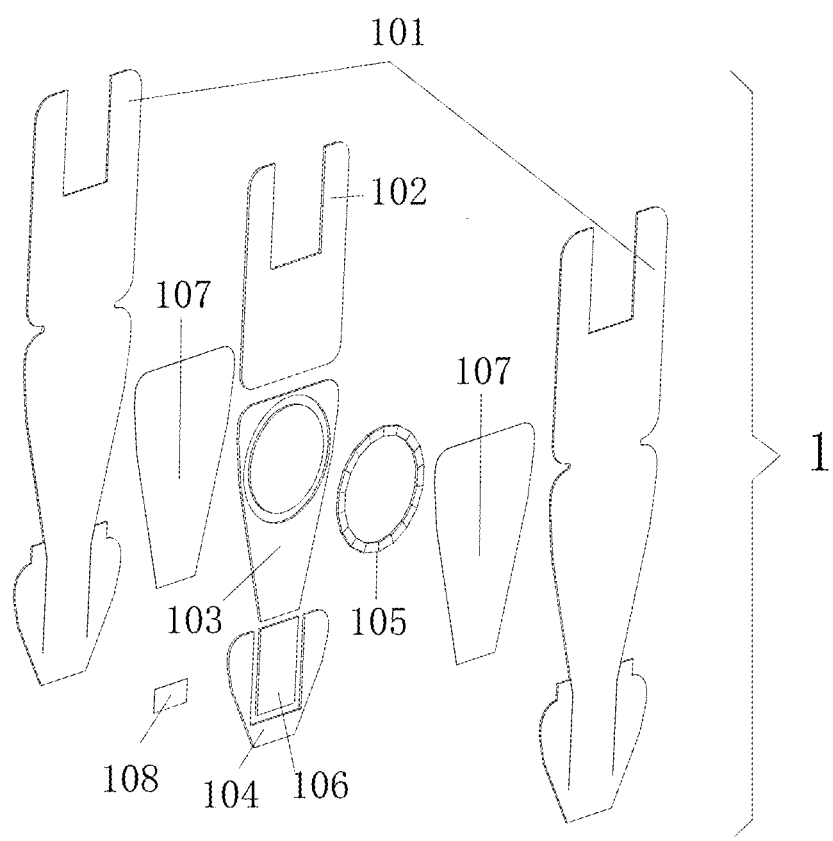
FIG. 3 is an exploded diagram of a folding assembly according to the present disclosure.

As shown in FIG. 3, the folding assembly 1 includes a first hard bone plate 102, a second hard bone plate 103, a third hard bone plate 104, a fourth hard bone plate 106, and two groups of support outer wrapping layers 101. The two groups of support outer wrapping layers 101 are sewn together to wrap the first hard bone plate 102, the second hard bone plate 103, the third hard bone plate 104 and the fourth hard bone plate 106 inside. The first hard bone plate 102, the second hard bone plate 103, the third hard bone plate 104 and the fourth hard bone plate 106 are not fixed to each other. Joints between the first hard bone plate 102, the second hard bone plate 103, the third hard bone plate 104 and the fourth hard bone plate 106 are connected through soft materials formed by the two groups of support outer wrapping layers 101. A first annular magnet 105 is fixed in an annular groove at a middle position of the second hard bone plate 103. First magnetic ring fixing plates 107 fixing the magnetic adsorption assembly inside the folding assembly 1 are fixed to two sides of the second hard bone plate 103. A magnet sheet 108 is mounted on a side of a bottom of the third hard bone plate 104 close to the support backplate 2. The third hard bone plate 104 and the fourth hard bone plate 106 are metal sheets capable of generating an adsorption effect with a magnet.

Figure 4:
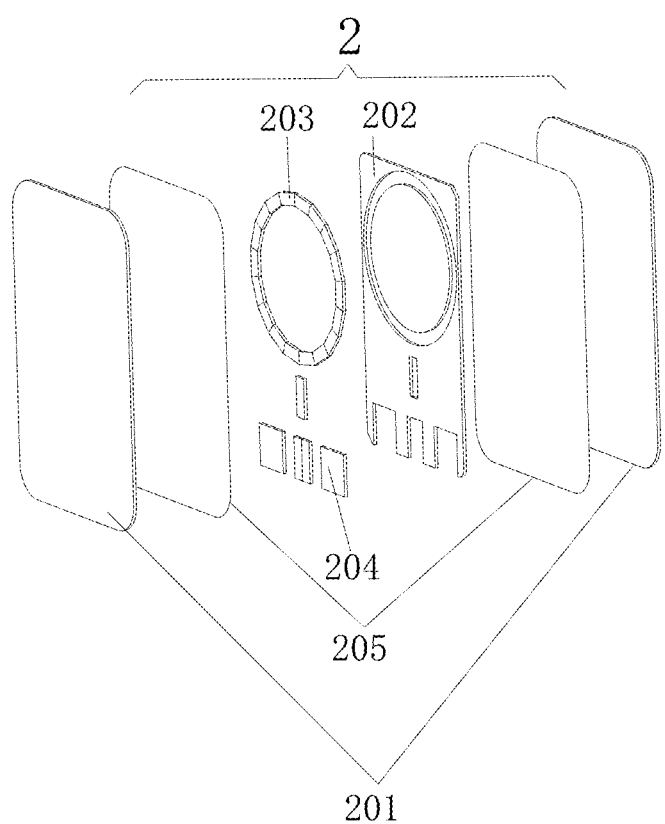
FIG. 4 is an exploded diagram of a support backplate according to the present disclosure.
Figure 5:
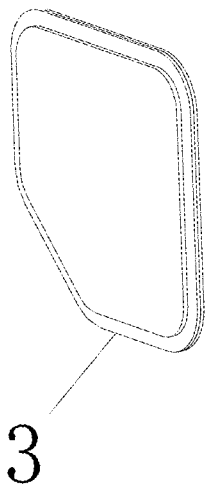
FIG. 5 is a specific schematic diagram of a bonding base according to the present disclosure.

As shown in FIG. 4, the support backplate 2 includes two groups of backplate outer wrapping layers 201 and a fifth hard bone plate 202. The two groups of backplate outer wrapping layers 201 are sewn together to wrap the fifth hard bone plate 202 inside. Magnets (204) are fixed in a groove formed in a bottom of the fifth hard bone plate 202. A second annular magnet 203 is fixed in an annular groove at a middle position of the fifth hard bone plate 202. Second magnetic ring fixing plates (205) fixing the magnetic adsorption assembly inside the support backplate 2 are fixed to two sides of the fifth hard bone plate 202.

Figure 6:
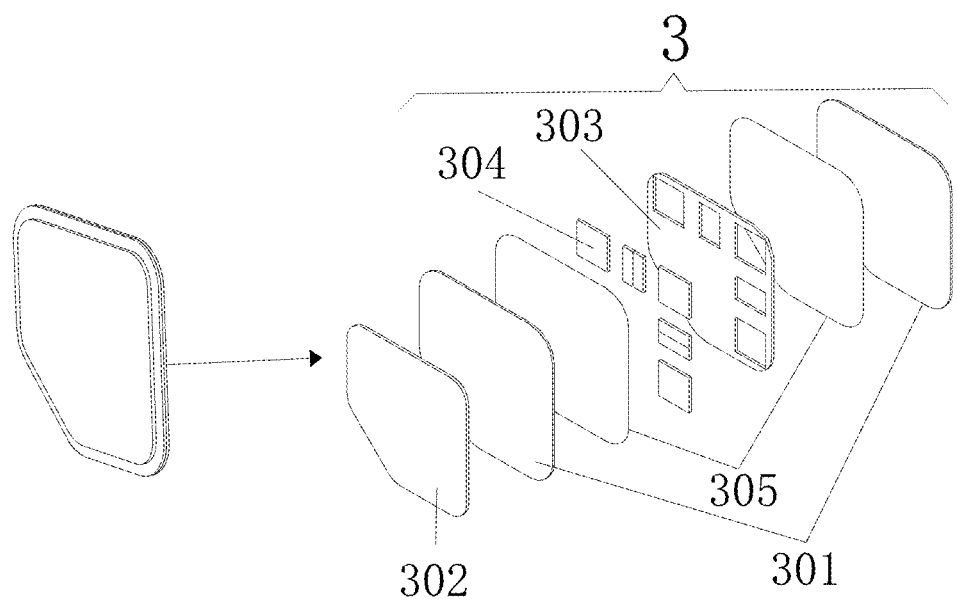
FIG. 6 is an exploded diagram of a bonding base according to the present disclosure.

As shown in FIG. 6, the bonding base 3 includes a double-sided adhesive member 302, a sixth hard bone plate 303, and two groups of bonding base outer wrapping layers 301. The two groups of bonding base outer wrapping layers 301 are sewn together to wrap the sixth hard bone plate 303 inside. The double-sided adhesive member 302 is fixed on an outer surface of one side of the bonding base outer wrapping layer 301. Bonding base magnets 304 are provided in two groups of grooves at a middle position of the sixth hard bone plate 303, and the two groups of grooves are staggered from each other. Third magnetic ring fixing plates 305 fixing the magnetic adsorption assembly inside the bonding base 3 are fixed to two sides of the sixth hard bone plate 303.

The first hard bone plate 102, the second hard bone plate 103, the first magnetic ring fixing plates 107, the fifth hard bone plate 202, and the sixth hard bone plate 303 are made of a metal or plastic material.

The support outer wrapping layers 101, the backplate outer wrapping layers 201, and the bonding base outer wrapping layers 301 are made of polyurethane (PU), or a genuine leather, or a fabric.

Figure 11:
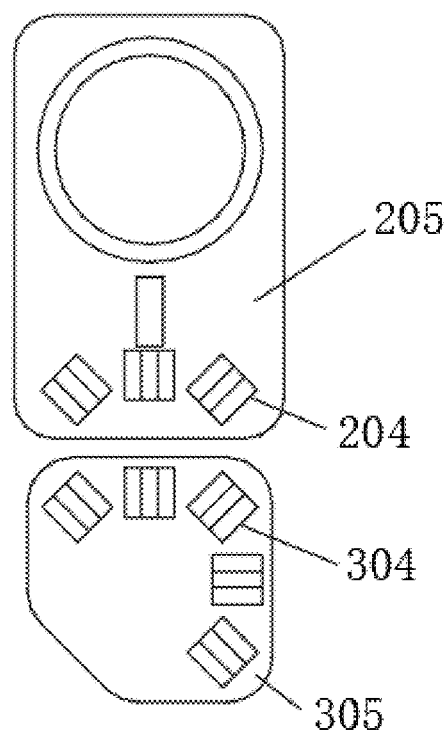
FIG. 11 is a schematic diagram of another form of magnets and bonding base magnets according to the present disclosure.

As shown in FIG. 11, the magnets 204 and the bonding base magnets 304 are all arranged obliquely at an angle of 45 degrees, and each include three strip-shaped magnet members. The magnets 204 and the bonding base magnets 304 are arranged at an angle of 45 degrees, such that an adsorption force between the relative magnetic adsorption assemblies can be increased.

The above shows and describes the basic principles, main features, and advantages of the present disclosure. It should be understood by those skilled in the art that, the present disclosure is not limited by the above embodiments, and the above embodiments and the descriptions only illustrate the principle of the present disclosure. Various changes and modifications may be made to the present disclosure without departing from the spirit and scope of the present disclosure, and such changes and modifications all fall within the claimed scope of the present disclosure. The claimed protection scope of the present disclosure is defined by the appended claims and equivalents thereof.

What is claimed is:

1. A multifunctional mobile phone mount, comprising a folding assembly, a support backplate, and a bonding base, wherein the support backplate is connected to a front surface of the folding assembly through a sewing process, an opening is provided at a top of a joint between the folding assembly and the support backplate, an interlayer space is formed between the folding assembly and the support backplate, a first magnetic adsorption assembly is provided inside the folding assembly, a third magnetic adsorption assembly is provided inside the bonding base, a second magnetic adsorption assembly and a fourth magnetic adsorption assembly are provided inside the support backplate, and a body comprising the folding assembly and the support backplate is fixed through adsorption between the fourth magnetic adsorption assembly and the third magnetic adsorption assembly inside the bonding base.

2. The multifunctional mobile phone mount according to claim 1, wherein the folding assembly comprises a first hard bone plate, a second hard bone plate, a third hard bone plate, a fourth hard bone plate, and two groups of support outer wrapping layers, wherein the two groups of support outer wrapping layers are sewn together to wrap the first hard bone plate, the second hard bone plate, the third hard bone plate and the fourth hard bone plate inside; the first hard bone plate, the second hard bone plate, the third hard bone plate and the fourth hard bone plate are not fixed to each other; joints between the first hard bone plate, the second hard bone plate, the third hard bone plate and the fourth hard bone plate are connected through soft materials formed by the two groups of support outer wrapping layers; the first magnetic adsorption assembly inside the folding assembly is formed by a first annular magnet fixed in an annular groove at a middle position of the second hard bone plate; first magnetic ring fixing plates fixing the magnetic adsorption assembly inside the folding assembly are fixed to two sides of the second hard bone plate; a magnet sheet is mounted on a side of a bottom of the third hard bone plate close to the support backplate; and the third hard bone plate and the fourth hard bone plate are metal sheets capable of generating an adsorption effect with a magnet.

3. The multifunctional mobile phone mount according to claim 2, wherein the support backplate comprises two groups of backplate outer wrapping layers and a fifth hard bone plate, wherein the two groups of backplate outer wrapping layers are sewn together to wrap the fifth hard bone plate inside; the fourth magnetic adsorption assembly inside the support backplate is formed by magnets fixed in a groove formed in a bottom of the fifth hard bone plate; the second magnetic adsorption assembly is formed by a second annular magnet fixed in an annular groove at a middle position of the fifth hard bone plate; and second magnetic ring fixing plates fixing the magnetic adsorption assembly inside the support backplate are fixed to two sides of the fifth hard bone plate.

4. The multifunctional mobile phone mount according to claim 3, wherein the bonding base comprises a double-sided adhesive member, a sixth hard bone plate, and two groups of bonding base outer wrapping layers, wherein the two groups of bonding base outer wrapping layers are sewn together to wrap the sixth hard bone plate inside; the double-sided adhesive member is fixed on an outer surface of one side of the bonding base outer wrapping layer; the third magnetic adsorption assembly inside the bonding base is formed by bonding base magnets provided in two groups of grooves at a middle position of the sixth hard bone plate; the two groups of grooves are staggered from each other; and third magnetic ring fixing plates fixing the magnetic adsorption assembly inside the bonding base are fixed to two sides of the sixth hard bone plate.

5. The multifunctional mobile phone mount according to claim 4, wherein the first hard bone plate, the second hard bone plate, the first magnetic ring fixing plates, the fifth hard bone plate, and the sixth hard bone plate are made of a metal or plastic material.

6. The multifunctional mobile phone mount according to claim 4, wherein the support outer wrapping layers, the backplate outer wrapping layers, and the bonding base outer wrapping layers are made of polyurethane (PU), or a genuine leather, or a fabric.

7. The multifunctional mobile phone mount according to claim 4, wherein the magnets and the bonding base magnets are all arranged obliquely at an angle of 45 degrees, and each comprise three strip-shaped magnet members.

* * * * *